(12) United States Patent
Bohmer et al.

(10) Patent No.: US 11,059,361 B2
(45) Date of Patent: Jul. 13, 2021

(54) HIGH VOLTAGE BATTERY PACK SUPPORT AND ISOLATION FOR ELECTRIFIED VEHICLES

(71) Applicant: FORD GLOBAL TECHNOLOGIES, LLC, Dearborn, MI (US)

(72) Inventors: Jeffrey Ronald Bohmer, Monroe, MI (US); Alexander Arena, Canton, MI (US); Mikolaj Tyksinski, Madison, WI (US); Erik Billimoria, Canton, MI (US); Kevin A. Montgomery, Royal Oak, MI (US); Hari Krishna Addanki, Novi, MI (US); Eid Farha, Ypsilanti, MI (US); Jesus Cardoso, Saline, MI (US); Marcela Arana, Plymouth, MI (US); Sukhwinder Singh Dhindsa, Windsor (CA); Jeffrey A. Walesch, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 228 days.

(21) Appl. No.: 16/120,671

(22) Filed: Sep. 4, 2018

(65) Prior Publication Data
US 2020/0070639 A1 Mar. 5, 2020

(51) Int. Cl.
*B60K 1/04* (2019.01)
*B62D 65/02* (2006.01)
(Continued)

(52) U.S. Cl.
CPC ............... *B60K 1/04* (2013.01); *B60L 50/64* (2019.02); *B62D 65/024* (2013.01);
(Continued)

(58) Field of Classification Search
CPC .... B60K 2001/0438; B60K 2001/0455; B60K 2001/0472; B60K 1/04; B60K 5/1208; H01M 50/242; H01M 50/249
See application file for complete search history.

(56) References Cited

U.S. PATENT DOCUMENTS

| | | | | |
|---|---|---|---|---|
| 3,894,607 A | * | 7/1975 | Brock | ..................... B60R 16/04 180/68.5 |
| 5,193,635 A | * | 3/1993 | Mizuno | ............... H01M 16/006 180/65.25 |

(Continued)

OTHER PUBLICATIONS

V. Ruiz, et al., A review of international abuse testing standards and regulations for lithium ion batteries in electric and hybrid electric vehicles, Renewable and Sustainable Energy Reviews 81 (2018) 1427-1452.

*Primary Examiner* — Emma K Frick
(74) *Attorney, Agent, or Firm* — David Coppiellie; Carlson, Gaskey & Olds (57) ABSTRACT

This disclosure details systems and methods for supporting and isolating vehicle body mounted battery packs from various vehicle loads. An exemplary electrified vehicle may include a frame, a battery support structure mounted to the frame, a battery pack, and one or more isolators. The battery pack is supported by the battery support structure but is not mechanically coupled to the frame. The isolator is mounted between the battery pack and the battery pack support structure for isolating the battery pack from loads that may be imparted on the frame and/or the battery support structure.

12 Claims, 6 Drawing Sheets

(51) Int. Cl.
*B60L 50/64* (2019.01)
*H01M 50/242* (2021.01)
*H01M 50/249* (2021.01)

(52) U.S. Cl.
CPC ... *H01M 50/242* (2021.01); *B60K 2001/0438* (2013.01); *H01M 50/249* (2021.01)

(56) References Cited

U.S. PATENT DOCUMENTS

| | | | | |
|---|---|---|---|---|
| 6,648,090 | B2 * | 11/2003 | Iwase | B60K 1/04 |
| | | | | 180/68.5 |
| 7,614,469 | B2 | 11/2009 | Kumar et al. | |
| 7,661,370 | B2 | 2/2010 | Pike et al. | |
| 7,762,363 | B1 * | 7/2010 | Hirschfeld | B60K 7/0007 |
| | | | | 180/65.1 |
| 8,286,743 | B2 * | 10/2012 | Rawlinson | B62D 29/008 |
| | | | | 180/68.5 |
| 8,728,642 | B2 | 5/2014 | Maskew et al. | |
| 8,833,499 | B2 * | 9/2014 | Rawlinson | F41H 7/042 |
| | | | | 180/68.5 |
| 8,944,401 | B2 * | 2/2015 | Guest | F16F 15/08 |
| | | | | 248/560 |
| 9,033,084 | B2 | 5/2015 | Joye | |
| 9,045,030 | B2 * | 6/2015 | Rawlinson | B62D 25/20 |
| 9,052,168 | B1 * | 6/2015 | Rawlinson | H01M 10/613 |
| 9,077,019 | B2 * | 7/2015 | Kosaki | H01G 11/18 |
| 9,126,295 | B2 * | 9/2015 | Tredan | B23P 25/00 |
| 9,227,582 | B2 * | 1/2016 | Katayama | B60L 3/0046 |
| 9,236,592 | B2 * | 1/2016 | Sundararajan | B62D 21/06 |
| 9,276,243 | B2 * | 3/2016 | Templeman | B63B 17/00 |
| 9,281,505 | B2 * | 3/2016 | Hihara | H01M 8/1072 |
| 9,283,837 | B1 * | 3/2016 | Rawlinson | B60R 13/0838 |
| 9,290,088 | B2 * | 3/2016 | Lejeune | H01M 2/1083 |
| D767,490 | S * | 9/2016 | Bose | D13/119 |
| 9,758,029 | B2 * | 9/2017 | Hokazono | B60K 1/04 |
| 9,812,685 | B2 * | 11/2017 | Nozaki | B60K 1/04 |
| 9,840,138 | B2 * | 12/2017 | Shirai | B60K 1/04 |
| 9,868,361 | B2 * | 1/2018 | Barbat | B62D 21/15 |
| 9,874,264 | B2 * | 1/2018 | Gaither | F16F 9/103 |
| 9,884,545 | B1 * | 2/2018 | Addanki | F16F 1/3605 |
| 9,899,648 | B2 * | 2/2018 | Templeman | H01M 50/20 |
| 9,937,780 | B2 * | 4/2018 | Murata | B60K 1/00 |
| 10,005,350 | B1 * | 6/2018 | Khan | B60K 1/04 |
| 10,065,490 | B2 * | 9/2018 | Haijima | H01M 2/1083 |
| 10,179,609 | B2 * | 1/2019 | Stenzenberger | H01M 2/1083 |
| 10,232,697 | B2 * | 3/2019 | Hara | B62D 25/025 |
| 10,431,791 | B2 * | 10/2019 | Lomax | H01M 2/1094 |
| 10,457,130 | B2 * | 10/2019 | Bengtsson | B60L 50/64 |
| 10,468,645 | B2 * | 11/2019 | Jackson | H01M 10/6556 |
| 10,471,843 | B2 * | 11/2019 | Chen | H01M 2/1083 |
| 10,516,192 | B2 * | 12/2019 | Prevost | B60L 58/21 |
| 10,611,425 | B2 * | 4/2020 | Miyashiro | B60K 1/04 |
| 10,618,425 | B2 * | 4/2020 | de Hesselle | B60K 1/04 |
| 10,634,206 | B2 * | 4/2020 | Hattori | B60K 5/1208 |
| 10,640,005 | B2 * | 5/2020 | Khan | B60K 1/04 |
| 10,647,213 | B2 * | 5/2020 | Otoguro | B62D 21/03 |
| 10,862,088 | B2 * | 12/2020 | Templeman | B60L 50/64 |
| 2002/0175455 | A1 * | 11/2002 | Tousi | F16F 3/093 |
| | | | | 267/140.3 |
| 2016/0226041 | A1 * | 8/2016 | Jackson | H01M 10/625 |
| 2019/0275875 | A1 * | 9/2019 | Fukui | B62D 25/20 |
| 2019/0326573 | A1 * | 10/2019 | Ozawa | H01M 50/20 |
| 2020/0070610 | A1 * | 3/2020 | Samyn | B60G 13/003 |

* cited by examiner

HIGH VOLTAGE BATTERY PACK SUPPORT AND ISOLATION FOR ELECTRIFIED VEHICLES

TECHNICAL FIELD

This disclosure relates to electrified vehicle battery packs, and more particularly to supporting and isolating vehicle body mounted battery packs from various vehicle loads.

BACKGROUND

The desire to reduce automotive fuel consumption and emissions has been well documented. Therefore, electrified vehicles are being developed that reduce or completely eliminate reliance on internal combustion engines. In general, electrified vehicles differ from conventional motor vehicles because they are selectively driven by one or more battery powered electric machines. Conventional motor vehicles, by contrast, rely exclusively on the internal combustion engine to propel the vehicle.

A high voltage battery pack typically powers the electric machines and other electrical loads of the electrified vehicle.

SUMMARY

An electrified vehicle according to an exemplary aspect of the present disclosure includes, among other things, a frame, a battery support structure mounted to the frame, a battery pack supported by the battery support structure, and an isolator mounted between the battery pack and the battery support structure.

In a further non-limiting embodiment of the foregoing electrified vehicle, the frame includes a first rail, a second rail, and a cross member extending between the first rail and the second rail, and the battery pack is at least partially between the first rail and the second rail.

In a further non-limiting embodiment of either of the foregoing electrified vehicles, the battery support structure is a metallic platform that is a completely separate component from an enclosure assembly of the battery pack.

In a further non-limiting embodiment of any of the foregoing electrified vehicles, a gap extends between a tray of the enclosure assembly and the battery support structure.

In a further non-limiting embodiment of any of the foregoing electrified vehicles, the metallic platform includes an outer frame and a plurality of beams that connect between members of the outer frame.

In a further non-limiting embodiment of any of the foregoing electrified vehicles, the battery support structure is mechanically coupled to the vehicle frame by a plurality of fasteners.

In a further non-limiting embodiment of any of the foregoing electrified vehicles, the plurality of fasteners are bolts or screws.

In a further non-limiting embodiment of any of the foregoing electrified vehicles, the battery pack, the isolator, and the battery support structure are coupled together by a plurality of fasteners.

In a further non-limiting embodiment of any of the foregoing electrified vehicles, a first fastener extends through the battery support structure and through the isolator and then into the battery pack, and a second fastener extends through a mounting flange of the isolator and into the battery support structure.

In a further non-limiting embodiment of any of the foregoing electrified vehicles, the first fastener and the second fastener extend in opposite directions.

In a further non-limiting embodiment of any of the foregoing electrified vehicles, the electrified vehicles includes a first fastener for mounting the battery support structure to the frame, a second fastener for coupling the battery pack, the isolator, and the battery support structure together, and a third fastener for mounting the isolator to the battery support structure.

In a further non-limiting embodiment of any of the foregoing electrified vehicles, the isolator includes an outer bushing, an inner bushing, and a damping portion between the outer bushing and the inner bushing.

In a further non-limiting embodiment of any of the foregoing electrified vehicles, the damping portion includes rubber.

In a further non-limiting embodiment of any of the foregoing electrified vehicles, a plurality of isolators are mounted between the battery pack and the battery support structure.

In a further non-limiting embodiment of any of the foregoing electrified vehicles, the electrified vehicle is a battery electric pickup truck.

A method according to another exemplary aspect of the present disclosure includes, among other things, mounting an isolator between a battery pack and a battery support structure, and mounting the battery support structure to a frame of an electrified vehicle. Once mounted, the battery support structure supports the battery pack and the isolator isolates the battery pack from vehicle loads.

In a further non-limiting embodiment of the foregoing method, mounting the isolator includes inserting a first fastener through the battery support structure, then through the isolator, and then into the battery pack.

In a further non-limiting embodiment of either of the foregoing methods, mounting the isolator includes inserting a second fastener through the isolator and into the battery support structure.

In a further non-limiting embodiment of any of the foregoing methods, mounting the battery support structure includes inserting a plurality of fasteners through the battery support structure and into the frame.

In a further non-limiting embodiment of any of the foregoing methods, mounting the isolator is performed prior to mounting the battery support structure to the frame.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details systems and methods for supporting and isolating vehicle body mounted battery packs from various vehicle loads. An exemplary electrified vehicle may include a frame, a battery support structure mounted to the frame, a battery pack, and one or more isolators. The battery pack is supported by the battery support structure but is not directly coupled to the frame. The isolator is mounted between the battery pack and the battery pack support structure for isolating the battery pack from loads that may be imparted onto the frame and/or the battery support structure. These and other features are discussed in greater detail in the following paragraphs of this detailed description.

Figure 1:
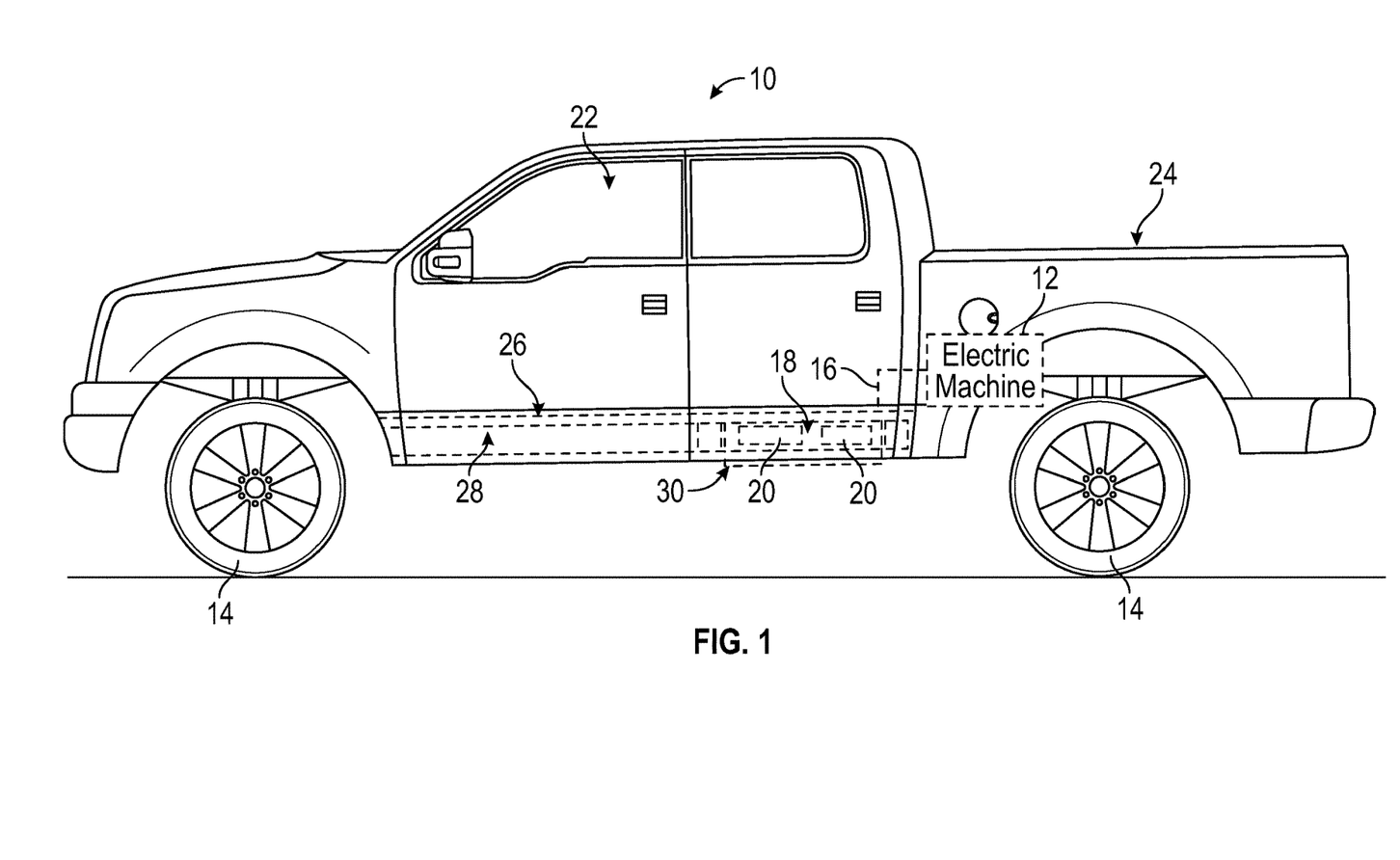
FIG. 1 schematically illustrates an electrified vehicle.

FIG. 1 schematically illustrates an electrified vehicle 10. The electrified vehicle 10 may include any type of electrified powertrain. In an embodiment, the electrified vehicle 10 is a battery electric vehicle (BEV). However, the concepts described herein are not limited to BEVs and could extend to other electrified vehicles, including, but not limited to, hybrid electric vehicles (HEVs), plug-in hybrid electric vehicles (PHEV's), fuel cell vehicles, etc. Therefore, although not specifically shown in this embodiment, the electrified vehicle 10 could be equipped with an internal combustion engine that can be employed either alone or in combination with other energy sources to propel the electrified vehicle 10.

In the illustrated embodiment, the electrified vehicle 10 is a full electric vehicle propelled solely through electric power, such as by one or more electric machines 12, without any assistance from an internal combustion engine. The electric machine 12 may operate as an electric motor, an electric generator, or both. The electric machine 12 receives electrical power and provides a rotational output torque to one or more drive wheels 14.

A voltage bus 16 electrically connects the electric machine 12 to a battery pack 18. The battery pack 18 is an exemplary electrified vehicle battery. The battery pack 18 may be a high voltage traction battery pack that includes a plurality of battery arrays 20 (i.e., battery assemblies or groupings of rechargeable battery cells) capable of outputting electrical power to operate the electric machine 12 and/or other electrical loads of the electrified vehicle 10. Other types of energy storage devices and/or output devices can also be used to electrically power the electrified vehicle 10.

In an embodiment, the electrified vehicle 10 is a pickup truck. However, the electrified vehicle 10 could also be a car, a van, a sport utility vehicle, or any other type of vehicle. Although a specific component relationship is illustrated in the figures of this disclosure, the illustrations are not intended to limit this disclosure. The placement and orientation of the various components of the electrified vehicle 10 are shown schematically and could vary within the scope of this disclosure. In addition, the various figures accompanying this disclosure are not necessarily drawn to scale, and some features may be exaggerated or minimized to show certain details of a particular component.

The battery pack 18 may be mounted at various locations of the electrified vehicle 10. In an embodiment, the electrified vehicle 10 includes a passenger cabin 22 and a cargo space 24 (e.g., a truck bed) located to the rear of the passenger cabin 22. A floor pan 26 may separate the passenger cabin 22 from a vehicle frame 28, which generally establishes the vehicle underbody. The battery pack 18 may be suspended from or otherwise mounted to the vehicle frame 28 such that it is remote from both the passenger cabin 22 and the cargo space 24. The battery pack 18 therefore does not occupy space that would otherwise be available for carrying passengers or cargo.

Due to its underbody mounting location, the battery pack 18 may be susceptible to various vehicle loads including, but not limited to, impact loads (e.g., imparted during collisions and running clearance events, for example), durability loads, torsional loads, bending loads, and noise, vibration, and harshness (NVH) loads. A novel mounting system 30 for mounting the battery pack 18 to the electrified vehicle 10 is therefore proposed in this disclosure. As discussed in greater detail below, the mounting system 30 is capable of both supporting the battery pack 18 and isolating the battery pack 18 from the various loads that may be imparted onto the vehicle frame 28 during operation of the electrified vehicle 10.

Figure 2:
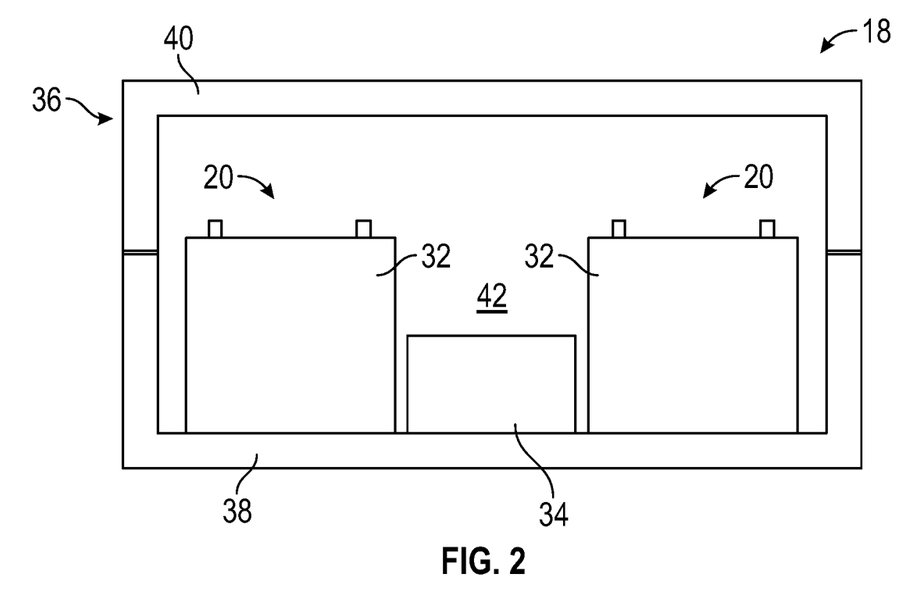
FIG. 2 illustrates an exemplary battery pack of an electrified vehicle.

FIG. 2 is a cross-sectional view of the battery pack 18 of FIG. 1. The battery pack 18 may house a plurality of battery cells 32 that store energy for powering various electrical loads of the electrified vehicle 10, such as the electric machine 12 of FIG. 1, for example. In an embodiment, the battery pack 18 houses prismatic, lithium-ion battery cells. However, battery cells having other geometries (cylindrical, pouch, etc.), other chemistries (nickel-metal hydride, lead-acid, etc.), or both could alternatively be utilized within the scope of this disclosure.

The battery pack 18 may additionally house one or more battery electronic components 34. The battery electronic component 34 could include a bussed electrical center (BEC), a battery electric control module (BECM), wiring harnesses, wiring loops, I/O connectors etc., or any combination of these battery electronic components.

The battery cells 32 may be grouped together in one or more battery arrays 20. In an embodiment, the battery pack 18 includes two battery arrays 20. However, the total numbers of battery cells 32 and battery arrays 20 employed within the battery pack 18 are not intended to limit this disclosure.

An enclosure assembly 36 may house each battery array 20 and battery electronic component 34 of the battery pack 18. Since the battery arrays 20 and the battery electronic components 34 are housed inside the enclosure assembly 36, these components are considered battery internal components of the battery pack 18. Although an example placement of the battery array 20 and the battery electronic components 34 is shown in FIG. 2, this particular placement is not intended to limit this disclosure. The battery internal components of the battery pack 18 can be arranged in any configuration inside the enclosure assembly 36.

In an embodiment, the enclosure assembly 36 is a sealed enclosure. The enclosure assembly 36 may include any size, shape, and configuration within the scope of this disclosure.

The enclosure assembly 36 may include a tray 38 and a cover 40. The tray 38 and the cover 40 cooperate to surround and enclose the battery arrays 20 and the battery electronic components 34. The tray 38 may provide an open area 42 for holding the battery arrays 20 and the battery electronic components 34. After positioning the battery arrays 20 and the battery electronic components 34 within the open area 42, the cover 40 may be seated and sealed to the tray 38 to enclose the battery arrays 20 and the battery electronic components 34.

In an embodiment, the enclosure assembly 36 is a metallic-based component. For example, the tray 38 and the cover 40 could be constructed out of aluminum or steel.

In another embodiment, the enclosure assembly 36 is a polymer-based component. For example, the tray 38 and the cover 40 could be constructed (e.g., molded) of expanded polymer-based materials, solid polymer-based materials, or a combination of such materials. Exemplary expanded polymer-based materials can include, but are not limited to, expanded polypropylene, expanded polystyrene, and expanded polyethylene. Exemplary solid polymer-based materials can include, but are not limited to, sheet moulding compounds (e.g., glass-fiber reinforced polyester), polypropylene, and polyamine.

In yet another embodiment, the enclosure assembly 36 could be constructed of both metallic-based and polymer-based components. For example, the tray 38 could be a metallic-based component and the cover 40 could be a polymer-based component. Other configurations are also contemplated within the scope of this disclosure.

Figure 3:
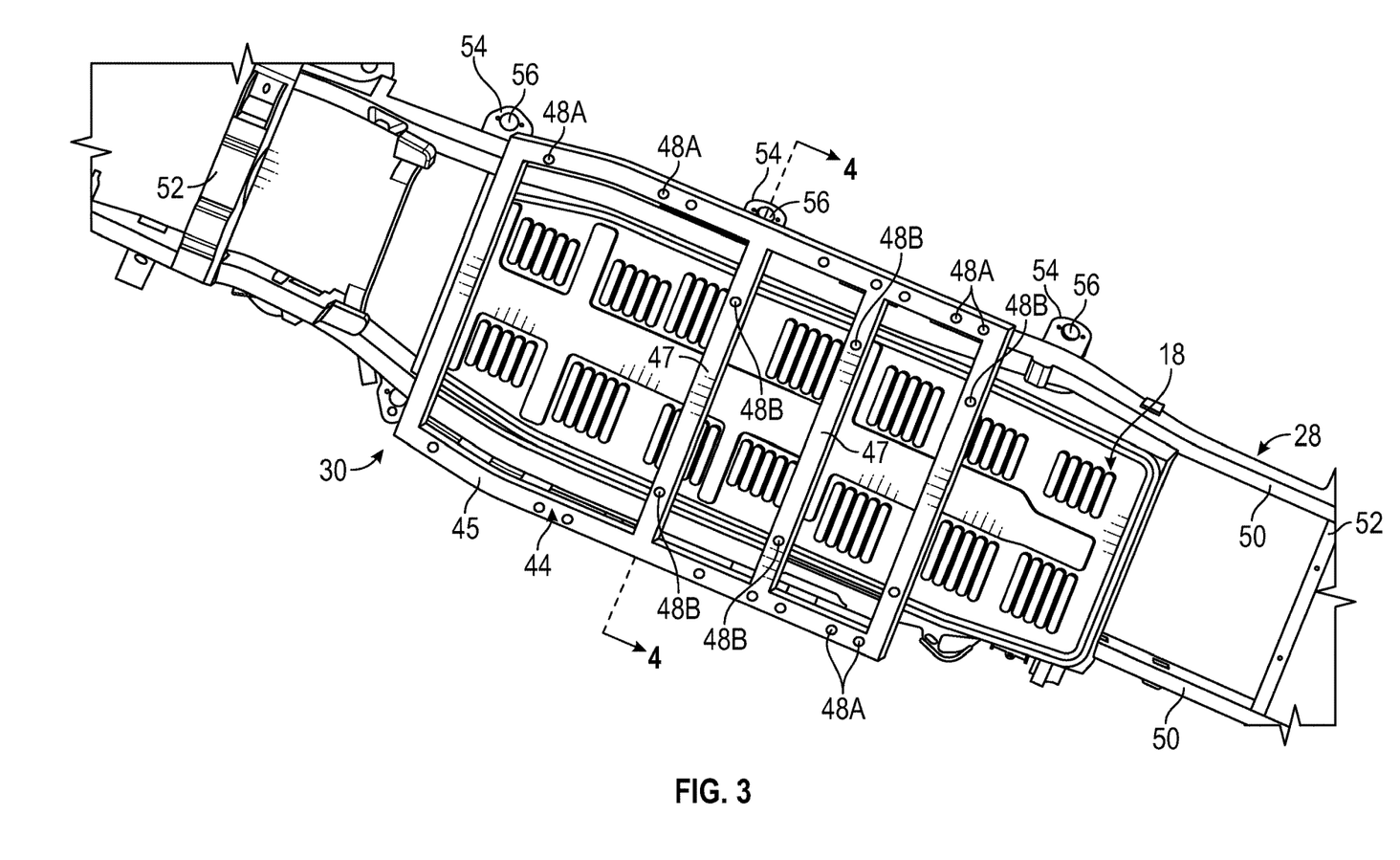
FIG. 3 illustrates a battery pack mounting system for mounting a battery pack to an electrified vehicle.
Figure 4:
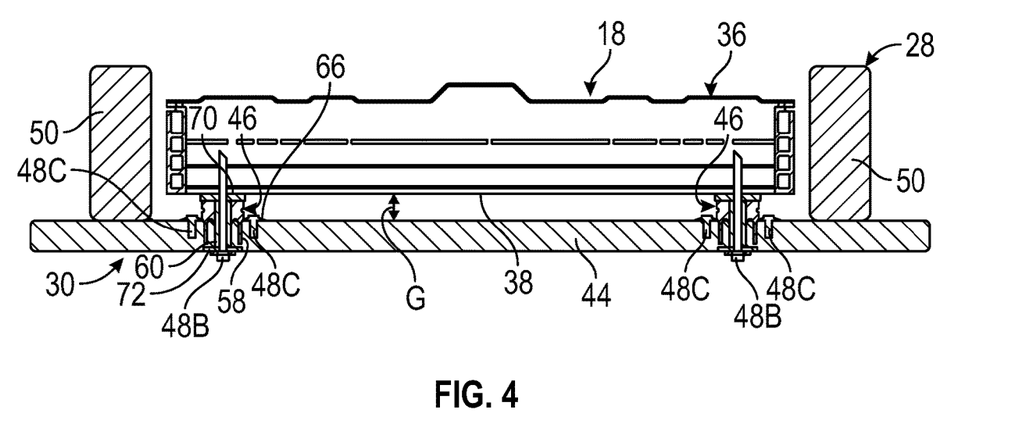
FIG. 4 is a cross-sectional view through section 4-4 of the battery pack mounting system of FIG. 3.
Figure 5:
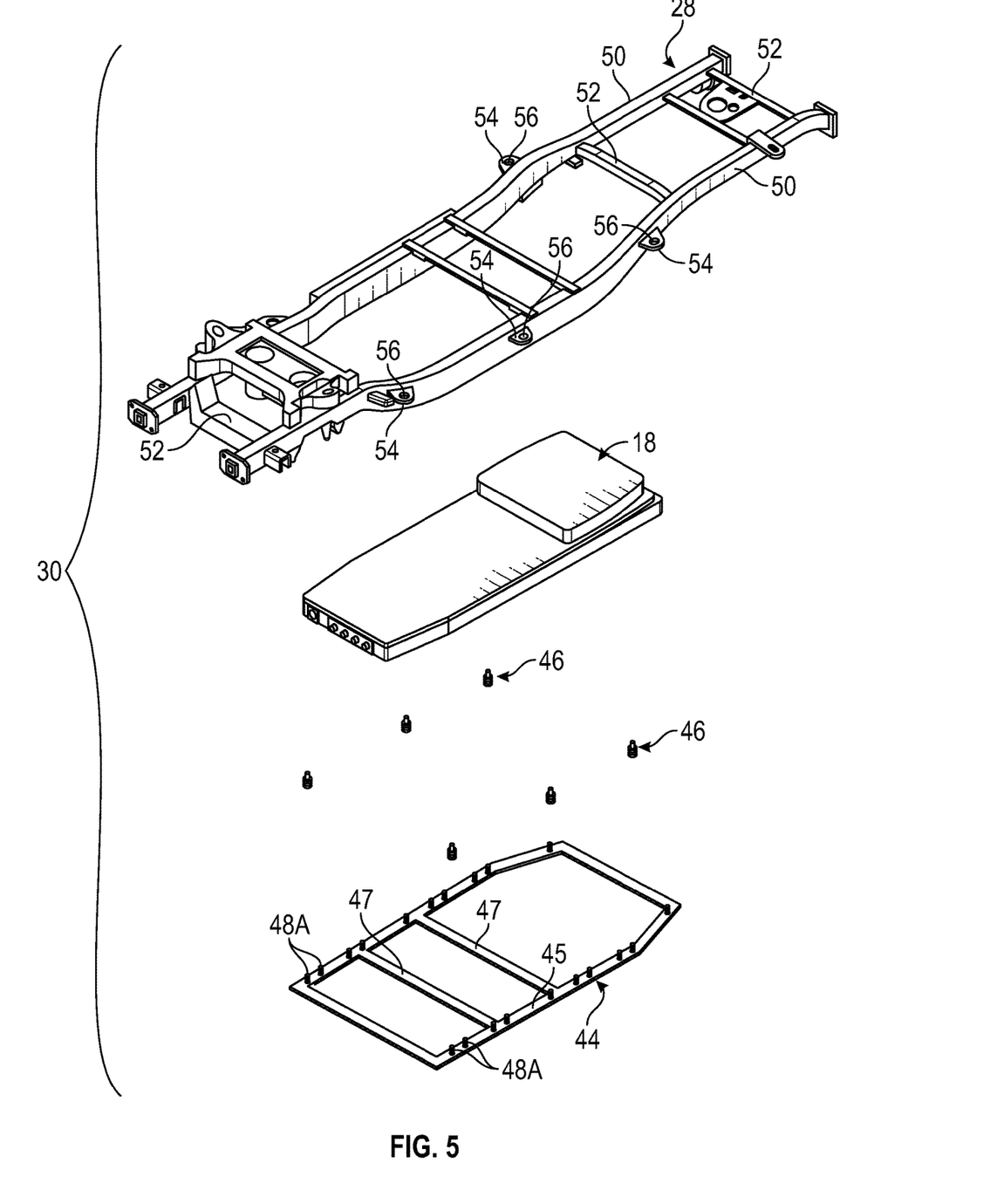
FIG. 5 is an exploded view of the battery pack mounting system of FIG. 3.

FIGS. 3, 4, and 5 illustrate an exemplary mounting system 30 for mounting the battery pack 18 to an electrified vehicle, such as the electrified vehicle 10 of FIG. 1. In an embodiment, the mounting system 30 includes a vehicle frame 28, a battery support structure 44, one or more isolators 46, and a plurality of fasteners 48A, 48B, and 48C.

The vehicle frame 28 (sometimes referred to simply as a "frame") is the main supporting structure of the electrified vehicle 10, to which various components are attached, either directly or indirectly. The vehicle frame 28 may include a unibody construction, in which the chassis and body of the electrified vehicle are integrated into one another, or may be part of a body-on-frame construction. The vehicle frame 28 may be made of a metallic material, such as steel, carbon steel, or an aluminum alloy, as non-limiting examples.

The vehicle frame 28 includes a plurality of rails 50 (sometimes referred to as "frame rails" or "beams"). FIGS. 3-5 show two such rails 50. The rails 50 are spaced apart from one another and extend longitudinally to establish a length of the vehicle frame 28. A plurality of cross members 52 may extend between the rails 50 of the vehicle frame 28. The cross members 52 may generally extend transversely relative to the rails 50 for establishing a width of the vehicle frame 28.

The battery support structure 44 may be a separate and distinct component from the enclosure assembly 36 of the battery pack 18. For example, the tray 38 of the enclosure assembly 36 may separate the battery internal components of the battery pack 18 from direct contact with the battery support structure 44. A gap G may extend between the tray 38 and the battery support structure 44 (see FIG. 4).

The battery support structure 44 may be a relatively rigid, metallic platform that supports the battery pack 18 when the battery pack 18 is in its mounted position relative to the electrified vehicle 10 (see, e.g., FIG. 3). In an embodiment, the battery support structure 44 is made of steel. However, other relatively rigid materials are also contemplated within the scope of this disclosure.

In an embodiment, the battery support structure 44 includes an outer frame 45 and a plurality of beams 47 that connect laterally between members of the outer frame 45. The beams 47 may be positioned to increase the strength and stiffness of the battery support structure 44. The specific arrangement of the outer frame 45 and the beams 47 is not intended to limit this disclosure.

In addition to supporting the battery pack 18, the battery support structure 44 may also stiffen the vehicle frame 28 for reducing torsional twist and may help prevent the rails 50 of the vehicle frame 28 from collapsing toward one another during side impact events. The battery support structure 44 may therefore substantially prevent various loads from being imparted to the battery pack 18.

The battery support structure 44 may be mechanically affixed to the vehicle frame 28 using a plurality of the fasteners 48A. In an embodiment, the rails 50 of the vehicle frame 28 include a multitude of brackets 54 that are configured for receiving the fasteners 48A. For example, each bracket 54 may include a receiving component 56 that is configured to fixedly accept at least one of the fasteners 48A. In an embodiment, the receiving components 56 include receiving nuts or dowels that can be embedded within a surface of each bracket 54. In another embodiment, the receiving components 56 include threaded openings formed in the brackets 54.

The fasteners 48A may be relatively rigid bolts or screws. Other rigid fasteners could also be used within the scope of this disclosure. The fasteners 48A provide high strength connectors for fixedly mounting the battery support structure 44 directly to the vehicle frame 28.

In the mounted position of the battery pack 18 as shown in FIG. 3, the battery pack 18 is at least partially between the rails 50 of the vehicle frame 28 but is not mechanically coupled to the vehicle frame 28. Rather, the battery pack 18 is mechanically decoupled from the vehicle frame 28. In this disclosure, the term "mechanically coupled" means fixedly connected, whereas the term "mechanically decoupled" denotes an absence of any direct fixed connection such that the vehicle frame 28 and the battery support structure 44 substantially absorb any momentum during vehicle loading events rather than the battery pack 18.

One or more of the isolators 46 may be positioned between the battery pack 18 and the battery support structure 44. The isolators 46, which may be referred to as bushings, are configured to dampen energy that is transmitted to the vehicle frame 28 and/or the battery support structure 44. Stated another way, the isolators 46 act as points of isolation for isolating the battery pack 18 from vibrations and other high acceleration loads that may act on the vehicle frame 28 and/or the battery support structure 44.

The isolators 46 may permit a relatively small amount of movement to occur between the battery pack 18 and the battery support structure 44. For example, the isolators 46 may allow the battery pack 18 to slightly move in multiple degrees of freedom relative to the battery support structure 44 in order to create a modal misalignment between the battery pack 18 and the battery support structure 44. This modal misalignment is effective to isolate the battery pack 18 from at least some of the loads that may act on the vehicle frame 28.

Referring now primarily to FIG. 4, the battery pack 18, the isolators 46, and the battery support structure 44 may be connected together using the fasteners 48B and 48C. The total number of fasteners 48B and 48C employed by the mounting system 30 may vary per design and is therefore not intended to limit this disclosure. In an embodiment, one of the fasteners 48B may extend through the battery support structure 44, then through one of the isolators 46, and then into the battery pack 18 in order to securely mount each isolator 46 between the battery pack 18 and the battery support structure 44, and two or more of the fasteners 48C may extend through each of the isolators 46 to mount each isolator 46 to the battery support structure 44. In general, the battery pack 18, the isolators 46, and the battery support structure 44 may be coupled together using the fasteners 48B, 48C before fixedly mounting the battery support structure 44 to the vehicle frame 28 using the fasteners 48A. In another embodiment, the fasteners 48A, 48B, and 48C each include different sizes.

The insertion direction of the fasteners 48C may be opposite from the insertion direction of the fasteners 48A, 48B. In an embodiment, the insertion direction of the fasteners 48C extends in a direction from the battery pack 18 toward the battery support structure 44, whereas the insertion direction of the fasteners 48A, 48B extends in a direction from the battery support structure toward the battery pack 18.

Figure 6A:
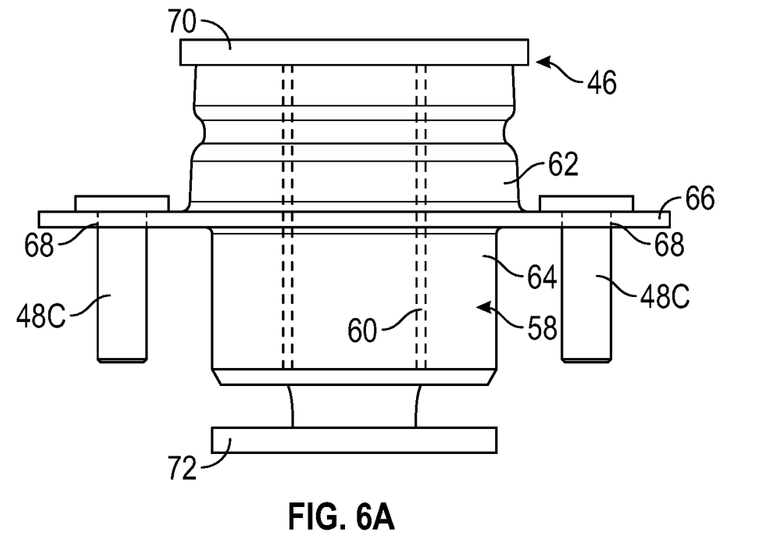
FIGS. 6A and 6B illustrate an exemplary isolator of the battery pack mounting system of FIGS. 3, 4, and 5.
Figure 6B:
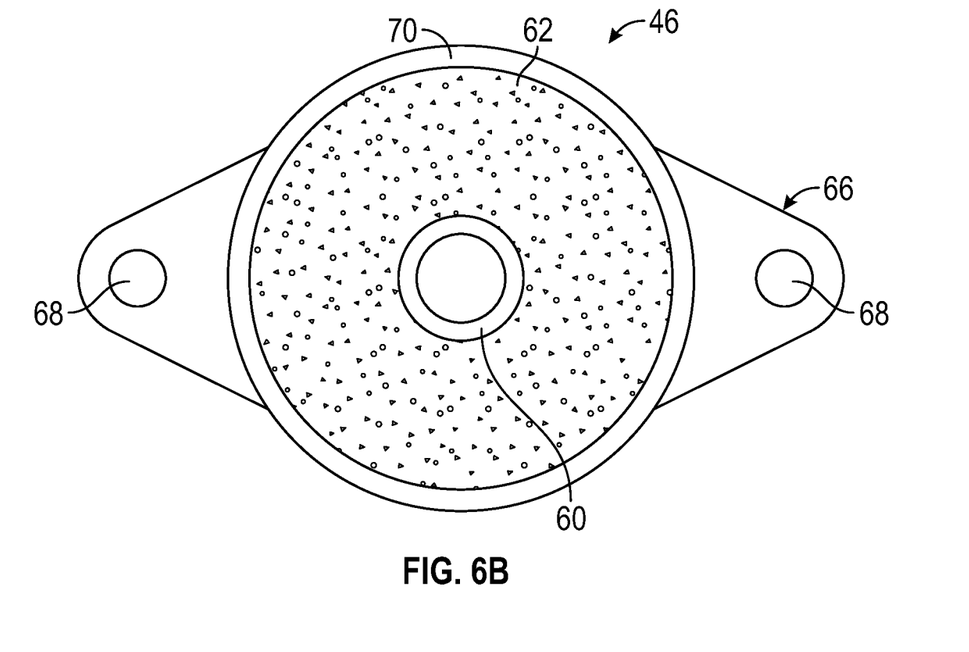

FIGS. 6A (side view) and 6B (top view), with continued reference to FIG. 4, illustrate an exemplary isolator 46 that can be used within the mounting system 30 for dampening vehicle loads, thereby preventing such loads from imparting into the battery pack 18. The isolator 46 may include an outer bushing 58, an inner bushing 60, and a damping portion 62 generally between the outer bushing 58 and the inner bushing 60. The damping portion 62 secures the outer bushing 58 to the inner bushing 60. The inner bushing 60 may be substantially cylindrical and receives a shaft of the fastener 48B (see FIG. 4). The outer bushing 58 may include a cylindrical portion 64 that is generally concentric with the inner bushing 60 and a mounting flange 66 that projects outwardly from the cylindrical portion 64. The fasteners 48C may be received through openings 68 formed in the mounting flange 66.

The isolator 46 may additionally include a first cover plate 70 at a first end of the damping portion 62 and a second cover plate 72 at a second opposite end of the damping portion 62. The damping portion 62 may thus interconnect between the first and second cover plates 70, 72. In an mounted position of the isolator 46 (see FIG. 4), the first cover plate 70 interfaces with the battery pack 18 and the second cover plate 72 interfaces with the battery support structure 44.

The damping portion 62 may be, for example, a high-carbon rubber that is both elastomeric and, optionally, electrically conductive. In other examples, the damping portion 62 is not electrically conductive. The damping portion 62 could be made of other elastomeric materials, including, polyurethane, silicones, metal-filled silicones, etc. The damping portion 62 is compressible relative to the outer bushing 58 and the inner bushing 60, by way of the elastomeric material, which permits the outer bushing 58 to move and flex relative to the inner bushing 60. While one exemplary isolator 46 has been described, this disclosure extends to other isolator configurations.

The exemplary battery pack mounting systems of this disclosure provide unique mounting solutions for both supporting a battery pack relative to an electrified vehicle and for isolating the battery pack from various vehicle loads. One or more isolators of the mounting system can substantially isolate the battery pack from the vehicle loads, and a separate battery support structure of the mounting system can support the battery pack while adding rigidity and stiffness to the vehicle frame, thereby substantially reducing the likelihood that torsional or impact loads acting upon the vehicle frame can be transferred into the battery pack 18.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. An electrified vehicle, comprising:
a frame;
a battery support structure mounted to the frame;
a battery pack supported by the battery support structure; and
an isolator mounted between the battery pack and the battery support structure,
wherein the isolator includes an outer bushing, an inner bushing, and a damping portion between the outer bushing and the inner bushing,
wherein the battery support structure is a metallic platform that is a completely separate component from an enclosure assembly of the battery pack,
wherein the battery support structure is mechanically coupled to the vehicle frame by a plurality of fasteners.

2. The electrified vehicle as recited in claim 1, wherein the frame includes a first rail, a second rail, and a cross member extending between the first rail and the second rail, and the battery pack is at least partially between the first rail and the second rail.

3. The electrified vehicle as recited in claim 1, wherein a gap extends between a tray of the enclosure assembly and the battery support structure.

4. The electrified vehicle as recited in claim 1, wherein the metallic platform includes an outer frame and a plurality of beams that connect between members of the outer frame.

5. The electrified vehicle as recited in claim 1, wherein the plurality of fasteners are bolts or screws.

6. The electrified vehicle as recited in claim 1, wherein the battery pack, the isolator, and the battery support structure are coupled together by a second plurality of fasteners.

7. The electrified vehicle as recited in claim 1, wherein the damping portion includes rubber.

8. The electrified vehicle as recited in claim 1, comprising a plurality of isolators mounted between the battery pack and the battery support structure.

9. The electrified vehicle as recited in claim 1, wherein the electrified vehicle is a battery electric pickup truck.

10. An electrified vehicle, comprising:
a frame;
a battery support structure mounted to the frame;
a battery pack supported by the battery support structure; and
an isolator mounted between the battery pack and the battery support structure,
wherein a first fastener extends through the battery support structure and through the isolator and then into the battery pack, and a second fastener extends through a mounting flange of the isolator and into the battery support structure.

11. The electrified vehicle as recited in claim 10, wherein the first fastener and the second fastener extend in opposite directions.

12. An electrified vehicle, comprising:
a frame;
a battery support structure mounted to the frame;
a battery pack supported by the battery support structure;
an isolator mounted between the battery pack and the battery support structure; and
a first fastener for mounting the battery support structure to the frame, a second fastener for coupling the battery pack, the isolator, and the battery support structure together, and a third fastener for mounting the isolator to the battery support structure.

* * * * *